(12) United States Patent
Marocchi et al.

(10) Patent No.: US 9,173,073 B2
(45) Date of Patent: Oct. 27, 2015

(54) METHOD AND APPARATUS FOR PROCESSING GROUP EVENT NOTIFICATIONS AND PROVIDING GROUP POLICY IN A COMMUNICATION SYSTEM

(75) Inventors: James A. Marocchi, Winfield, IL (US); Trent J. Miller, West Chicago, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 297 days.

(21) Appl. No.: 13/329,774

(22) Filed: Dec. 19, 2011

(65) Prior Publication Data
US 2013/0159521 A1   Jun. 20, 2013

(51) Int. Cl.
| | |
|---|---|
| *G06F 15/173* | (2006.01) |
| *H04W 4/08* | (2009.01) |
| *H04L 12/813* | (2013.01) |
| *H04W 76/00* | (2009.01) |
| *H04W 72/12* | (2009.01) |

(52) U.S. Cl.
CPC ............... *H04W 4/08* (2013.01); *H04L 47/20* (2013.01); *H04W 76/002* (2013.01); *H04W 72/121* (2013.01)

(58) Field of Classification Search
CPC . H04L 41/0816; H04L 41/0893; H04L 41/06; H04L 2012/5638; H04L 2012/5642
USPC ................... 709/220, 221, 225, 228
See application file for complete search history.

(56) References Cited

U.S. PATENT DOCUMENTS

| | | | | |
|---|---|---|---|---|
| 8,437,265 | B2 * | 5/2013 | Zhi et al. ...................... | 370/252 |
| 2007/0168523 | A1 * | 7/2007 | Jiang et al. ................... | 709/228 |
| 2008/0147796 | A1 * | 6/2008 | Chmara et al. ................ | 709/204 |
| 2009/0207841 | A1 * | 8/2009 | Huang et al. .................. | 370/390 |
| 2009/0274163 | A1 * | 11/2009 | Huang et al. .................. | 370/432 |
| 2010/0121960 | A1 | 5/2010 | Baniel et al. | |

(Continued)

FOREIGN PATENT DOCUMENTS

| | | |
|---|---|---|
| WO | 2008096258 | 8/2008 |
| WO | 2008107778 A1 | 9/2008 |
| WO | 2010086013 A1 | 8/2010 |
| WO | 2011006889 A1 | 1/2011 |
| WO | WO 2011140707 A1 * | 11/2011 |

OTHER PUBLICATIONS

Yong Sun, et al. "Enhanced Multimedia Services Based on Integrated IMS-MBMS Architecture in LTE Networks", Feb. 2010; 5 Pages.

(Continued)

*Primary Examiner* — Jonathan Bui
(74) *Attorney, Agent, or Firm* — Terri Hughes Smith; Steven A. May

(57) ABSTRACT

A group event processing entity receives and processes a group event notification wherein a set of policy rules is determined that controls the performance of an action as relates to at least one of a member user equipment of a group session or an access network resource for the group session. Additionally, a group policy decision entity receives a request to establish a group access network resource for a group of user equipment and determines a set of applicable policy rules for establishing the group access network resource, wherein the set includes a policy rule that controls performance of an action when a base station in a wireless access network is unable to provide resources to support the requested group access network resource. The group policy decision entity provides the set of applicable policy rules to a group policy enforcement entity.

10 Claims, 10 Drawing Sheets

(56) References Cited

U.S. PATENT DOCUMENTS

| | | | |
|---|---|---|---|
| 2010/0142517 A1* | 6/2010 | Montemurro et al. | 370/352 |
| 2010/0165902 A1 | 7/2010 | Kvernvik et al. | |
| 2010/0211678 A1* | 8/2010 | McDysan et al. | 709/225 |
| 2010/0235519 A1* | 9/2010 | Hu et al. | 709/227 |
| 2010/0291923 A1* | 11/2010 | Zhou et al. | 455/432.1 |
| 2010/0312852 A1* | 12/2010 | Kamga et al. | 709/217 |
| 2011/0045851 A1* | 2/2011 | Maddox et al. | 455/466 |
| 2011/0083153 A1* | 4/2011 | Cedervall et al. | 725/88 |
| 2011/0106939 A1* | 5/2011 | Kitamura et al. | 709/224 |
| 2011/0270956 A1* | 11/2011 | McDysan et al. | 709/220 |
| 2012/0002583 A1* | 1/2012 | Kong et al. | 370/312 |
| 2012/0101952 A1* | 4/2012 | Raleigh et al. | 705/304 |
| 2012/0151551 A1* | 6/2012 | Readshaw et al. | 726/1 |
| 2012/0204248 A1* | 8/2012 | Gonzalez et al. | 726/8 |
| 2012/0254427 A1* | 10/2012 | Adams et al. | 709/225 |
| 2012/0275300 A1* | 11/2012 | Munoz de la Torre Alonso | 370/229 |
| 2013/0007287 A1* | 1/2013 | Chu et al. | 709/227 |
| 2013/0064160 A1* | 3/2013 | Newberg et al. | 370/312 |
| 2013/0150024 A1* | 6/2013 | Burbidge et al. | 455/423 |
| 2013/0272268 A1* | 10/2013 | Xu et al. | 370/331 |
| 2014/0105011 A1* | 4/2014 | Chandramouli et al. | 370/230 |
| 2014/0250451 A1* | 9/2014 | Huang | 725/25 |

OTHER PUBLICATIONS

Justino Santos, et al. "Multicast/Broadcast Network Convergence in Next Generation Mobile Networks", 2008.

Filipe Cabral Pinto, et al. "Signalling for IMS and MBMS Integration", ICT-Mobilesummit 2008 Conference Proceedings.

3GPP TS 22.146 V9.0.0; 3rd Generation Partnership Project: Technical Specification Group Services and System Aspects; Multimedia Broadcast/Multicast Service; Stage 1 (Release 9); Jun. 2008.

3GPP TS 23.246 V9.5.0; 3rd Generation Partnership Project: Technical Specification Group Services and System Aspects; Multimedia Broadcast/Multicast Service (MBMS); Architecture and Functional Description (Release 9); Jun. 2010.

3GPP TS 22.246 V9.0.0; 3rd Generation Partnership Project: Technical Specification Group Services and System Aspects; Multimedia Broadcast/Multicast Service (MBNS) User Services; Stage 1 (Release 9); Dec. 2009.

International Search Report and Written Opinion for International Patent Application No. PCT/US2012/69057 mailed May 6, 2013.

Rosenberg, J., et al., "SIP: Session Initiation Protocol," Network Working Group, RFC 3261, Jun. 2002, pp. 1-269.

Calhoun, P., et al., "Diameter Base Protocol," Network Working Group, RGV 3588, Sep. 2003, pp. 1-148.

* cited by examiner

METHOD AND APPARATUS FOR PROCESSING GROUP EVENT NOTIFICATIONS AND PROVIDING GROUP POLICY IN A COMMUNICATION SYSTEM

FIELD OF THE DISCLOSURE

The present disclosure relates generally to group communications, and more particularly to apparatus and procedures for handling group event notifications and provisioning and implementing policy rules for dynamically allocated group transports in wireless communication systems.

BACKGROUND

Multimedia Broadcast and Multicast Service (MBMS) is specified in multiple 3rd Generation Partnership Project Technical Specifications (3GPP TSs), e.g., 3GPP TS 22.246 and 26.346 (also referred to herein as the 3GPP MBMS standard), and is a unidirectional point-to-multipoint service which allows media to be transmitted in the downlink direction, from a single source to many recipients. The 3GPP MBMS standard was designed so that it could be implemented on network infrastructures already in place for wireless communications in order to facilitate the simultaneous distribution of scheduled programming material, multimedia, and emergency broadcasts to a group of subscribers or authorized users. 3GPP is a collaborative effort launched in 1998 involving various international standards bodies working toward the goal of formalizing global wireless communication systems based on Universal Mobile Telecommunications System (UMTS) standards. Current 3GPP standards are defined via a suite of individually documented releases referred to collectively, herein, as the 3GPP TSs.

Presently, broadcast- and multicast-equipped systems are orientated toward the transmission of scheduled programming, which results in a system with curtailed functionality. With MBMS-based mobile TV, for example, a paid subscriber can watch a broadcast that airs at a predetermined time. What is lacking, however, is the ability for applications or user equipment (UE) to reliably and dynamically allocate an MBMS bearer with policy in real time. To appreciate the utility of being able to dynamically manage MBMS bearers within a wireless communication system, consider an urban police force having the ability to dynamically create and manage a wide-area group where images of a suspect taken from surveillance footage are simultaneously shared with all authorized officers, including those already on patrol. Accordingly, for emergency responders, the ability to dynamically manage MBMS resources for group communications, for example, through the use of group policy rules and event notifications, is of great value. However, current policy rules do not provide the ability to dynamically manage allocated group transports or the ability to process corresponding event notifications.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
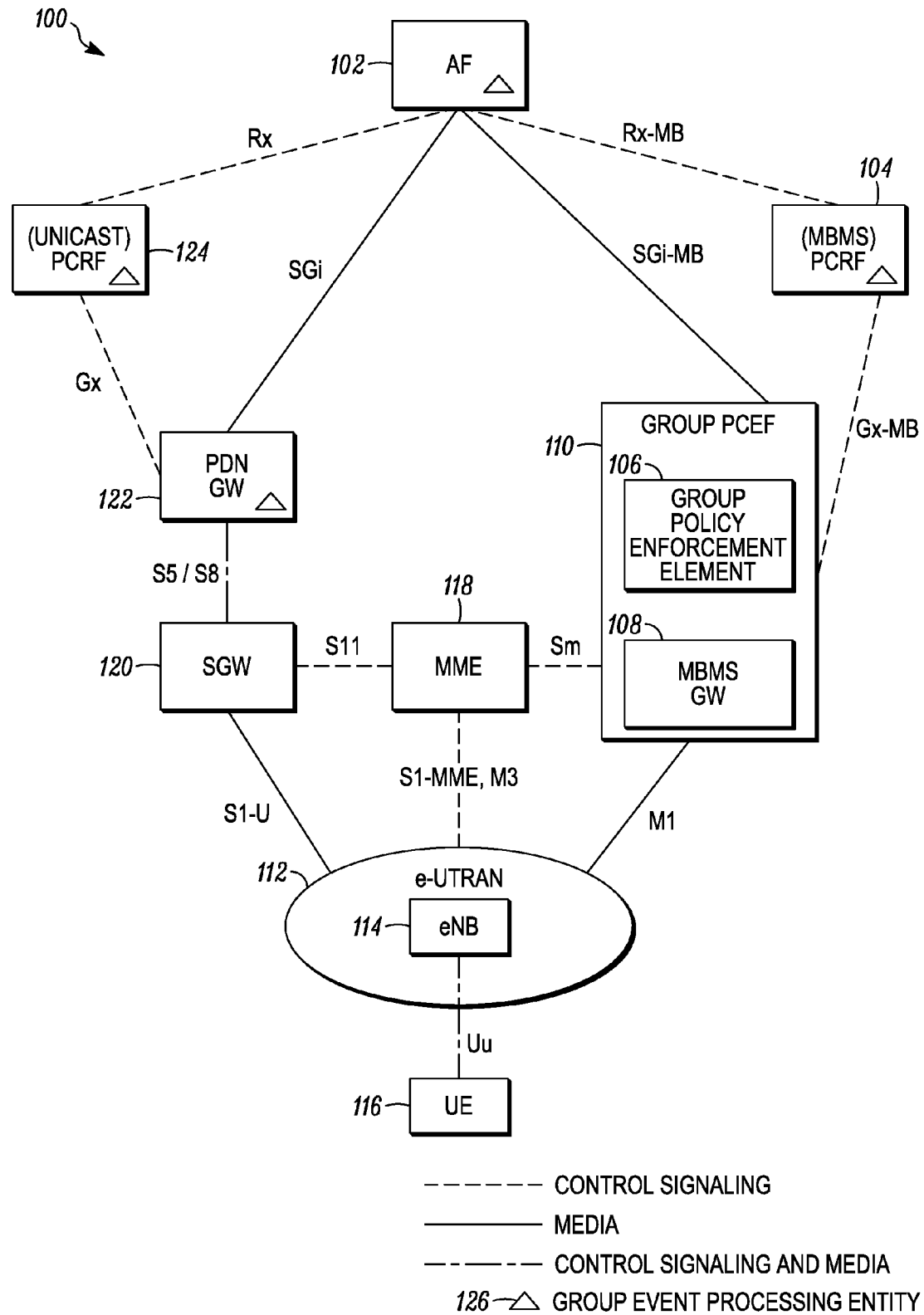
FIG. 1 is a block diagram illustrating a communication system adapted for implementing embodiments of the present teachings.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, the present disclosure provides a method and apparatus for handling group event notifications and provisioning and implementing policy rules for group transports (also referred to herein as "group policy") in wireless communication systems. In accordance with the teachings herein, a method for receiving and processing group event notifications in a point-to-multipoint-enabled communication system includes a group event processing entity, within a group policy decision entity of the point-to-multipoint-enabled communication system, receiving a group event notification pertaining to an asynchronous group event affecting a group session established to transmit media using a group access network resource. The group event processing entity further determines, based on the group event notification, a set of applicable policy rules that control the performance of an action related to at least one of a member user equipment of the group session or an access network resource for the group session.

Further in accordance with the teachings herein, a method for receiving and processing group event notifications in a point-to-multipoint-enabled communication system includes a group event processing entity, within an application function entity of the point-to-multipoint-enabled communication system, receiving a group event notification pertaining to an asynchronous group event affecting a group session established to transmit media using a group access network resource. The group event processing entity further processes the group event notification to control the performance of an action related to the group session.

Also in accordance with the teachings herein, a method for providing group policy in a communication system includes a group policy decision entity receiving a request to establish a group access network resource for a group of user equipment. The group policy decision entity further determines a set of applicable policy rules for establishing the group access network resource, wherein the set includes a policy rule that controls performance of an action when a base station in a wireless access network is unable to provide access network resources to support the requested group access network resource. The group policy decision entity also provides the set of applicable policy rules to a group policy enforcement entity.

Referring now to the drawings, and in particular FIG. 1, a communication system implementing embodiments in accordance with the present teachings is shown and indicated generally at 100. System 100 comprises system elements of an Application Function (AF) entity 102, a Group Policy and Charging Rules Function (PCRF) 104, a Group Policy and Charging Enforcement Function (PCEF) 110 having a Group Policy Enforcement Element (GPEE) 106 and an MBMS Gateway (MBMS GW) 108, a radio access network (RAN) 112 (in this case, an evolved Universal Terrestrial Radio Access Network (eUTRAN) having an eNodeB or eNB (i.e., a Long Term Evolution (LTE) base station) 114, a Mobility Management Entity (MME) 118, a Serving Gateway (SGW) 120, a Packet Data Network Gateway (PDN-GW) 122, a Unicast PCRF 124, a Group Event Processing Entity (GEPE) 126, and a User Equipment (UE) 116. Only a limited number of system elements 102, 104, 106, 108, 110, 112, 114, 116, 118, 120, 122, 124 and 126 are shown for ease of illustration, but additional such elements may be included in the communication system 100. Moreover, other components needed for a commercial embodiment of the system 100 are omitted from the drawing for clarity in describing the enclosed embodiments.

Furthermore, in this illustrative implementation, communication system 100 is a 3GPP communication system meaning that at least some of the system elements are adapted or configured to operate in conformity with one or more aspects of the 3GPP TSs. Accordingly, system elements preceded by "3GPP," such as 3GPP MBMS GW or 3GPP BM-SC, shall herein refer to system elements that conform to 3GPP standards as defined by the aforementioned suite of technical specifications. In addition, a 3GPP system element that has been "modified" or "enhanced" means that the system element conforms to 3GPP standards as defined by the aforementioned suite of 3GPP TSs but is also adapted with additional functionality to facilitate implementations of the teachings herein.

System 100 may also be appropriately referred to as an LTE communication system (which is defined herein as a system wherein at least some of its elements are configured to operate in conformity with one or more aspects of 3GPP LTE TSs) or an MBMS-enabled communication system (which is defined herein as a communication system that includes at least a 3GPP MBMS GW). However, system 100 may be any point-to-multipoint enabled communication system, including systems that use multicast transports, broadcast transports, or both. Moreover, the teachings herein are applicable to any communication system having a core network and a RAN that is adaptable to provide for group policy provisioning and the processing of group event notifications for group communications as taught herein. For example, the present teachings are also applicable to 3GPP2 and Worldwide Interoperability for Microwave Access (WiMAX) communication systems.

We now turn to a brief description of the system elements within communication system 100. In general, the AF entity 102, Group PCRF 104, and Group PCEF 110 are adapted with functionality and interfaces (also referred to as reference points) in accordance with embodiments of the present disclosure as described in detail below with respect to the remaining figures. More particularly, the AF entity 102 is a physical server that provides one or more application functions that require dynamic MBMS resources, including dynamic group policy in accordance with the present teachings. Such application functions may include, for example, video conferencing and real-time video streaming, push-to-talk (PTT), Voice over IP (VoIP) conferencing, broadcast messaging applications, picture or discrete media sharing, etc., wherein media is sent to one or more subscribers using an access network resource. An access network resource is defined as radio frequency resources provided by a RAN (also generally referred to herein as a wireless access network). Multiple AF entities 102 may be distributed across a communication system, each of which may contain one or more application functions. In one illustrative implementation, an AF entity 102 is included as part of the infrastructure of an enterprise network, such as one operated by a public safety agency and, thereby, may provide one or more public safety related applications, such as a Computer Aided Dispatch (CAD) application. Throughout the remainder of these teachings, the AF and the AF entity 102 shall sometimes be interchangeably referred to as AF 102, where the intended meaning is clear from context.

As used herein, an access network resource is a "group" access network resource when it supports a group transport (also referred to herein as a group bearer). A group transport is defined herein as a guaranteed bit-rate (GBR) or non-GBR unidirectional (downlink only) transmission path of defined capacity, delay, and bit error rate, which supports point-to-multipoint transmissions, such as, for instance, broadcast or multicast transmissions. By contrast, a unicast transport (or unicast bearer) is a bidirectional transmission path of defined capacity, delay, and bit error rate, which supports only point-to-point transmissions.

The AF 102 supports UE-initiated and network-initiated communication sessions that utilize unicast transports, group transports, or both. A communication session is defined as a series of interactions or communications between a plurality of endpoints, such as, UEs, and occurs between a time that the session is initiated and a time that the session is terminated. A communication session is a "group" communication session where the communications between two or more UEs are associated with an identifiable group (e.g., via a group identifier (ID), a group name, or a list of group participants).

Session initiation, termination, and any modifications to the session are affected using signaling defined by any suitable proprietary or standard session management protocol, such as Session Initiation Protocol (SIP) as defined in Internet Engineering Task Force (IETF) Request for Comments (RFC) 3261 dated June 2002. The particular session management protocol depends on the system design requirements and preferences. A UE "joins" and, thereby, becomes a "member UE" of a given communication session, wherein the UE's communications are associated with that group communication session, by exchanging the necessary signaling (e.g., SIP signaling) defined by the applicable session management protocol. Similarly, the UE exchanges the required signaling (e.g., SIP signaling) to exit or leave the group communication session and, thereby, cease being a member UE of the communication session.

For communication sessions that require the use of only unicast transports, the unicast transports are requested, managed, and released (and the policy for the establishment, management, and release of such transports are determined and enforced) using the Unicast PCRF 124, the PDN GW 122, the SGW 120, the MME 118 and the eNB 114 within a core network of system 100, which in this illustrative embodiment is an Evolved Packet Core. A core network is defined herein as inclusive of the system elements between the AF 102 and the RAN 112. As such, the AF 102 and the RAN 112 are excluded from the definition of the core network. Accordingly, the Unicast PCRF 124, the PDN GW 122, the SGW 120, the MME 118 and their associated interfaces (i.e., Rx, Gx, SGi, S5/S8, S11, S1-U, and S1-MME) are adapted to conform to the 3GPP TSs for establishment, management, and release of unicast bearers and the policy associated therewith, and will, thus, not be further described for the sake of brevity. Such 3GPP TSs include, but are not limited to, 3GPP TS 23.203, 23.401, 29.212 and 29.214.

For communications that require the use of group access network resources comprising at least one group transport, the group access network resources are requested, established, managed, and released (and the policy for the establishment, management, and release of such transports are determined and enforced) using the Group PCRF 104, the Group PCEF 110, the MME 118 and their associated interfaces (e.g., M1, M3, Sm, SGi-MB, Gx-MB, and Rx-MB) within the core network of system 100, wherein these system elements are adapted in accordance with the present teachings. More particularly, in accordance with embodiments of the present disclosure, as described for example with respect to the remaining figures, the Group PCRF 104 serves as a group policy decision entity for the core network of system 100. Accordingly, the Group PCRF 104 is adapted to determine and provide to the Group PCEF 110 applicable "group policy rules" defined herein as policy rules that control the establishing, managing, and release of group access network resources, such as group transports established to facilitate multicast or broadcast transmissions, e.g., MBMS bearers. What is meant by "establishing" an access network resource or a transport includes the initial establishment of such resources and transports upon initial session setup or the modification of such resources and transports (including setting up additional transports or deleting transports) upon session modification.

In this illustrative system implementation, the Group PCEF 110 serves as a group policy enforcement entity for the core network of system 100 and, thereby, enforces the applicable group policy rules via the Group Policy Enforcement Element 106. The Group PCEF 110 also signals group event notifications received from the communication system 100 to the Group PCRF 104. Included in the Group PCEF 110 is a 3GPP MBMS GW 108 that interfaces with the MME 118 over a Sm control interface for managing group access network resources provided by the e-UTRAN 112 via one or more eNB 114. User plane data received by the MBMS GW 108 from the AF 102 or from a UE is sent over the M1 interface for multicast or broadcast distribution by one or more eNB 114 to the UE via a Uu control and signaling interface.

Let us now turn the discussion to the interfaces (e.g., reference points) in accordance with the present teachings. Such interfaces include: an Rx-MB control plane interface established directly between the AF 102 and the Group PCRF 104; a Gx-MB control plane interface established directly between the Group PCRF 104 and the Group PCEF 110; and an SGi-MB user plane interface established directly between the AF 102 and the Group PCEF 110. As used herein, a control plane interface facilitates the transfer of only control signaling associated with the management of transports for a communication session; a user plane interface facilitates the transfer of only media associated with a communication session; and a control and user plane interface facilitates the transfer of both control signaling and media associated with a communication session. Moreover, an interface being established "directly" between two system elements means that there are no intervening system elements.

As described in detail below by reference to FIGS. 2-7, for instance, and as distinguished from prior art, the above-mentioned interfaces have the following illustrative features in accordance with the present teachings. Group policy that includes at least a policy rule that controls performance of an action when a base station in a wireless access network resource is unable to provide resources to support the requested group access network resource is transferred over the Gx-MB interface. Group event notifications are transferred over the Gx-MB and the Rx-MB interfaces. Media is sent directly from the AF 102 to the Group PCEF 110 over the SGi-MB interface. As used herein, "media" is defined as any information (inclusive of both voice and data) other than control signaling that is transmitted to a UE during a communication session.

In an illustrative system implementation shown in FIG. 1, the Group PCRF 104 and the Unicast PCRF 124 are implemented on separate physical platforms, and the Group PCEF 110 and the PDN GW 122 (which includes a unicast 3GPP PCEF that is not shown) are implemented on separate physical platforms. However, in other embodiments, the Group PCRF 104 and the Unicast PCRF 124 may share a physical platform as described in additional detail by reference to FIG. 9 and FIG. 10. Furthermore, in an embodiment, the Rx-MB and Gx-MB interfaces are implemented using Diameter protocol (as defined in IETF RFC 3588 dated September 2003, and any subsequent revisions) that carries control information using attribute-value pairs (AVPs). The SGi-MB interface is implemented using an application-dependent protocol to carry user plane signaling. Alternatively, any suitable standard or proprietary protocol and data representation can be used for these interfaces. Control and media information transferred over various references points (for instance as described by reference to FIGS. 2, 3, 5 and 7) is also generally referred to herein as signaling and messages.

System 100 further includes a Group Event Processing Entity (GEPE) 126 (indicated in the figure by a triangle) in accordance with embodiments of the present teachings. The GEPE 126 is responsible for receiving, processing, and responding to group event notifications, including establishing, modifying, or releasing a group transport as the result of specific group events. In accordance with the present teachings, the GEPE 126 is located either within the AF entity 102, the Group PCRF 104, or the Integrated PCRF 902 (as indicated by the placement of triangles in FIGS. 1, 8, 9 and 10). The GEPE 126 and its associated functionality are further described below with respect to FIGS. 4, 5, 6 and 7.

The UEs, e.g., 116, are mobile communication devices that facilitate communication of media to users when they are attached to a RAN. UEs are also commonly referred to in the art as mobile devices, access devices, access terminals, mobile stations, mobile subscriber units, subscriber units, user devices, and the like, and can be any type of communication device, such as radios, mobile phones, mobile data terminals, Personal Digital Assistants (PDAs), laptops, two-way radios, cell phones, etc. As shown, the UE 116 is attached to the core network through the eNB 114 within the e-UTRAN 112.

In general, as used herein, infrastructure devices, such as the AF 102, the Group PCRF 104, the Group PCEF 110, the eNB 114, the UE 116, the Unicast PCRF 124, the PDN GW 122, the SGW 120, the MME 118, and the GEPE 126 (or their hardware) being "configured" or "adapted" means that such elements are implemented using one or more (although not shown) memory devices, network interfaces, and/or processing devices that are operatively coupled. The memory devices, network interfaces, and/or processing devices, when programmed, form the means for these system elements to implement their desired functionality, for example, as illustrated by reference to the methods shown in FIGS. 2-7.

The network interfaces are used for passing signaling, also referred to herein as messaging (e.g., messages, packets, datagrams, frames, superframes, and the like), containing control information, voice or non-voice media between the elements of the system 100. The hardware implementation of the network interface in any particular element depends on the particular type of network, i.e., wired and/or wireless, to which the element is connected. For example, the UEs utilize wireless network interfaces to wirelessly attach to eNBs 114, while individual infrastructure devices, such as the MME 118, Group PCEF 110, Group PCRF 104, and AF 102 may be connected by wired network interfaces which transmit control signals and media. It should be noted that use of the term "network interface," herein, refers at least in part to a hardware interface implementation. Whereas, the use of the term "interface" without the preceding word "network" refers to a logical interface which is "adapted" or "configured" by use of a software protocol or data structure.

Where the network supports wireless communications, the network interfaces comprise elements including processing, modulating, and transceiver elements that are operable in accordance with any one or more standard or proprietary wireless network interfaces, wherein some of the functionality of the processing, modulating, and transceiver elements may be performed by means of the processing device through programmed logic, such as, software applications or firmware stored on the memory device of the system element or through hardware. Examples of wired network interfaces include Ethernet, T1, USB interfaces, etc.

The processing devices utilized by the elements of system 100 may be partially implemented in hardware and, thereby, programmed with software or firmware logic or code for performing functionality described by reference to FIGS. 2-7; and/or the processing devices may be completely implemented in hardware, for example, as a state machine or application specific integrated circuit (ASIC). The memory implemented by these system elements can include short-term and/or long-term storage of various information needed for the functioning of the respective elements. The memory may further store software or firmware for programming the processing device with the logic or code needed to perform its functionality.

Figure 2:
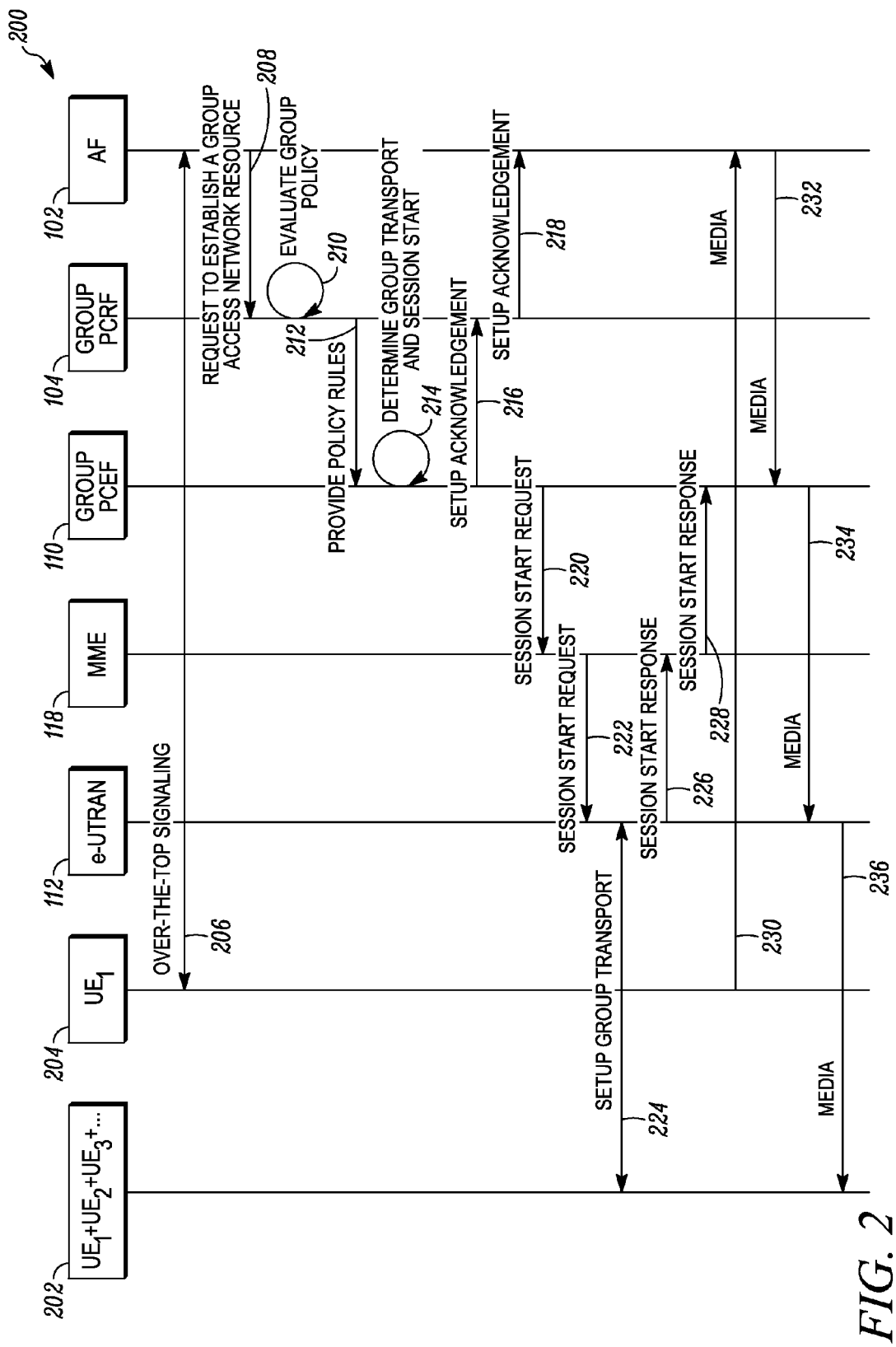
FIG. 2 is a message sequence diagram illustrating the provisioning of group policy for a group session in accordance with an embodiment of the present teachings.

We now turn to a detailed description of the functionality of the system 100 elements in accordance with the teachings herein and by reference to the remaining figures. FIG. 2 is a message sequence diagram 200 illustrating messages sent between various system elements to facilitate the provisioning of group policy for a group session in accordance with an embodiment of the present teachings. More particularly, FIG. 2 illustrates the request for and establishment of a group access network resource during a group session initiation, which may be requested by the AF 102 (network initiated) or the UE 116 (device initiated). The system elements shown in FIG. 2 include the AF 102, the Group PCRF 104, the Group PCEF 110, the MME 118, the e-UTRAN 112, a plurality of UEs (UE$_1$, UE$_2$, UE$_3$ ... ) 202, and a UE$_1$ 204 in the plurality.

Considering the network initiated group session first, the AF 102 sends a request 208 to establish a group access network resource comprising a group transport to the Group PCRF 104 via the Rx-MB interface. Upon receiving the request 208, the Group PCRF 104 evaluates (210) group policy, wherein the Group PCRF 104 determines, from a set of stored policy rules, an applicable set of policy rules to govern the creation and management of the requested group transport. Group policy rules provisioned by the Group PCRF 104 and enforced by the Group PCEF 110 support both GBR and non-GBR bearers.

Group policy is defined herein as a set (meaning one or more) of group policy rules that relate to a group session for establishing, managing, modifying or releasing a group transport. The set of applicable policy rules determined by the Group PCRF 104 includes, in accordance with the present teachings, at least a group policy rule that controls performance of an action when a base station in a wireless access network is unable to provide access network resources to support the requested group access network resource. However, the set of applicable group policy rules may include one or more other group policy rules, as described in detail below.

To determine an applicable set of group policy rules, the Group PCRF 104 can also utilize pertinent information accompanying the request 208 sent by the AF 102. Such information might include: the identities and locations of the users that are to participate in the group session, application type, type of media which is to be shared, a reservation priority, minimal bandwidth, Quality of Service (QoS) requirements, and/or the desired length of time for the requested session. The applicable group policy rules themselves may be determined by a variety of methods, which might include, for example, the use of an algorithm, the application of logic rules, a list of tabulated values, extraction from a database, or any other suitable method. Assuming the requested group transport is valid in accordance with group policy, the determined set of applicable policy rules is then pushed (212) from the Group PCRF 104 across the Gx-MB interface to the Group PCEF 110, which is responsible for enforcing the rules. The Group PCEF 110 determines (214), from the applicable group policy rules and the other information received from the Group PCRF 104, the type of group transport that is to be established based on the requested transport attributes, and starts (214) the group session. Broadcast and multicast service bearers (e.g., 3GPP MBMS bearers) serve as two examples of possible group transport types.

A setup acknowledgement is then sent (216) from the Group PCEF 110 back to the Group PCRF 104, which continues to flow (218) back to the initiating AF 102 across the Gx-MB and Rx-MB interfaces, respectively. A session start request, which contains a designated QoS, is also sent (220) across the Sm interface from the Group PCEF 110 to the MME 118, and from there is sent (222) to the e-UTRAN 112 across the M3 interface, to request establishment of the group transport. When the session start request is received by the e-UTRAN 112, the group transport is initialized (224) between the eNBs 114 and the UEs 202 participating in the session using the Uu interface. Following the initialization of the group transport, a session start response 226, 228 is sent back up to the Group PCEF 110 via the MME 118 and the M3 and Sm interfaces. Source media is now sent from an originating UE 204 to multiple receiving UEs 202. The source media is first sent (230) up to the AF 102, and then sent (232) down to the Group PCEF 110 using the SGi-MB media interface. From the Group PCEF 110, the media is sent (234) across the M1 interface to the e-UTRAN 112 where it is transmitted (236) to the receiving UEs 202 from the eNBs 114 over the wireless interface.

In some instances, the order of signaling may be interchanged where the overall functionality is preserved. For example, it is possible that the setup acknowledgement is signaled (216) to the Group PCRF 104 before the determination of the group transport and session start at 214. Similarly, with reference to FIG. 5, the Group PCRF 104 may provide (510) information and/or instructions to the AF 102 before it transmits (508) policy rules to the Group PCEF 110 for enforcement.

In the second case depicted by FIG. 2, the request to establish a group session starts with the originating UE 204 which engages in over-the-top signaling (206) with the AF 102 to make a determination as to which group transport will be required for a given application. Once a determination has been made, the AF 102 signals the request 208 with the requirements and any pertinent information to the Group PCRF 104 across the Rx-MB interface, and the process proceeds as previously described for the network-initiated case. In addition to over-the-top signaling, in-line signaling may also be used by the UE 204 to initiate a group session as described below by reference to FIG. 3.

Figure 3:
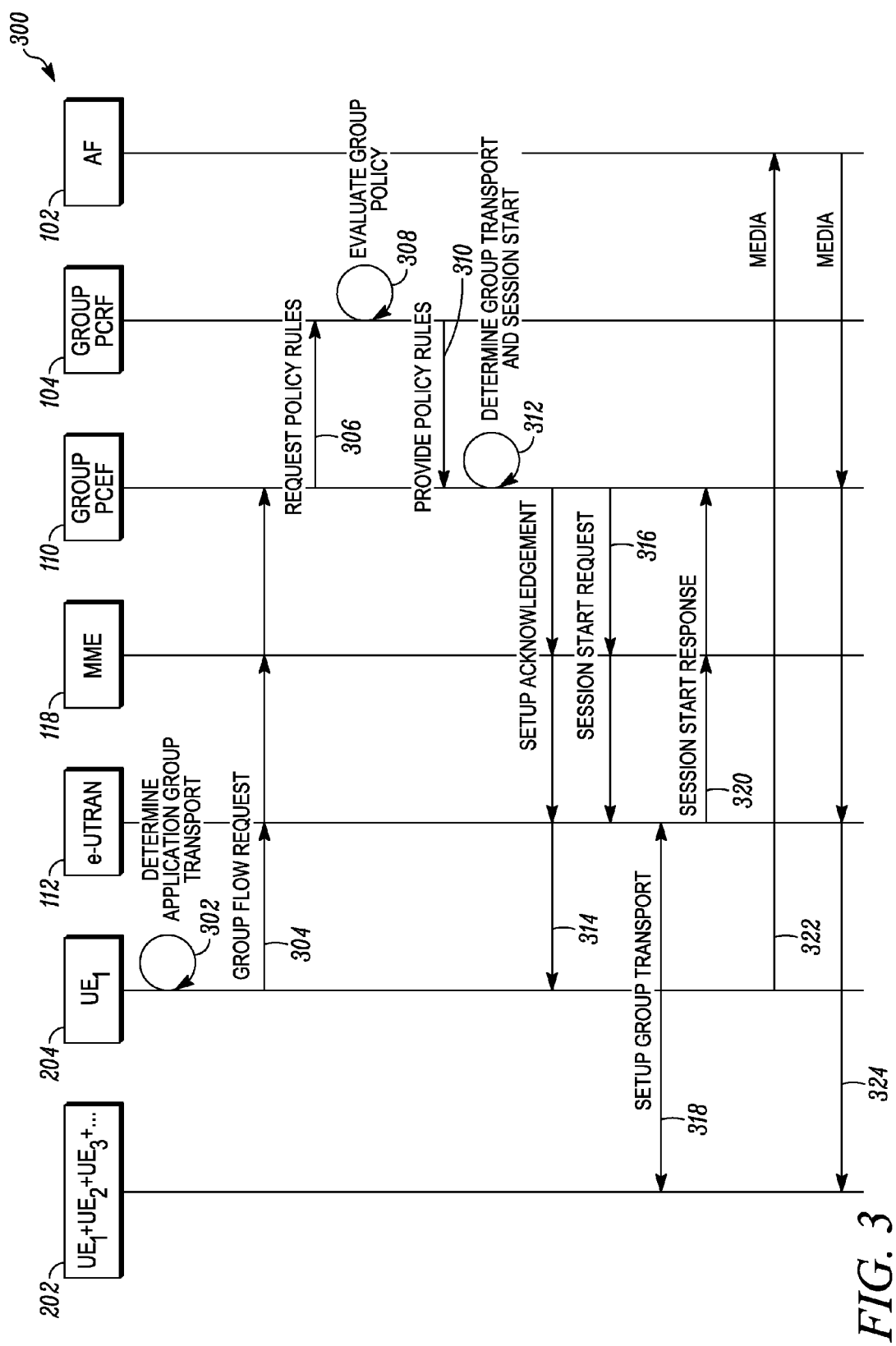
FIG. 3 is a message sequence diagram illustrating the provisioning of group policy for a user-initiated group session in accordance with an embodiment of the present teachings.

FIG. 3 is a message sequence diagram illustrating the provisioning of group policy for a user-initiated group session in accordance with an embodiment of the present teachings. More particularly, FIG. 3 illustrates messages sent between various system elements to facilitate with the provisioning of group policy for a device initiated group session via in-line signaling. The system elements shown in FIG. 3 include the AF 102, the Group PCRF 104, the Group PCEF 110, the MME 118, the e-UTRAN 112, a plurality of UEs ($UE_1$, $UE_2$, $UE_3$ ... ) 202, and a $UE_1$ 204 in the plurality.

The process begins with $UE_1$ 204 making a determination (302) as to a group transport for a particular application. A group flow request 304 (which serves as a request for a group access network resource) along with any relevant information, such as application type and reservation priority, for example, is then signaled up to the Group PCEF 110 through the control plane via the e-UTRAN 112 and MME 118 across the M3 and Sm interfaces respectively. When the Group PCEF 110 receives the request for the group transport, it queries (306) the Group PCRF 104 via the Gx-MB interface for applicable policy rules. The Group PCRF 104 then evaluates (308) group policy and, thereby, determines a set of applicable group policy rules just as it did (at 210) for the cases discussed above with respect to FIG. 2, with the only difference being that the policy is being requested by the Group PCEF 110 rather than the AF 102. The set of applicable group policy rules is then pulled (310) from the Group PCRF 104 back across the Gx-MB interface by the Group PCEF 110 and used to determine (312) the type of group transport that is to be set up 312. Group policy rules provisioned by the Group PCRF 104 and enforced by the Group PCEF 110 support both GBR and non-GBR bearers and includes at least a group policy rule that controls performance of an action when a base station in a wireless access network is unable to provide access network resources to support the requested group access network resource.

After the bearer has been established, a setup acknowledgement 314 is sent back down to the initiating UE 204 via the MME 118 and e-UTRAN 112 using the Sm, M3 and Uu interfaces, respectively. A session start request 316 is also sent down to the e-UTRAN 112 by way of the MME 118, to initialize (318) the group transport between the eNBs 114 within the e-UTRAN 112 and the UEs 202 participating in the session using the Uu interface. The e-UTRAN 112 then signals a session start response 320 back up to the Group PCEF 110 before the source media 322 is uploaded to the AF 102. From the AF 102, the media is sent (324) down to the Group PCEF 110 via the SGi-MB interface and then across the M1 interface to the e-UTRAN 112 where it is transmitted to the receiving UEs 202 from the eNBs 114 over the wireless interface.

While FIGS. 2 and 3 illustrate the use of group policy rules to establish a group access network resource, such as, a group transport or a 3GPP MBMS bearer, it is important to realize that group policy rules can just as easily be used to terminate bearers or modify the attributes of bearers. For example, if the AF 102 determines that the QoS of an established MBMS bearer should be increased, a set of group policy rules can be determined and implemented to accomplish this. As used herein, QoS is defined as the collective effect of service performance which determines the degree of satisfaction of a user of a service and is characterized by the combined aspects of performance factors applicable to all services. For an LTE communication system, such performance factors include, but are not limited to, admission priority, retention priority, maximum requested bandwidth, guaranteed (minimum) bandwidth, scheduling priority, packet loss rate, and packet latency. In current QoS frameworks, the QoS differentiation is affected by assigning values to one or more QoS parameters, wherein these QoS parameter values make up and define a QoS profile.

The set of applicable group policy rules determined by the Group PCRF 104 and provided to the Group PCEF 110 may include, but are not limited to, a group policy rule that indicates: what 3GPP MBMS service area or cell(s) to use to establish the group access network resource; time of day controls for establishing or terminating the group access network resource; how network traffic and available bandwidth affect the establishment of the requested resource; whether an MBMS bearer should be established, or how to proceed, if MBMS resources cannot be found at all eNBs in a service area; whether UEs should be allowed to dynamically switch between multicast and unicast service; whether unicast resources should be used in the event that the requested group access network resource is unavailable; how many UEs must be present in a cell before establishing the group access network resource in the cell; or whether UEs in a cell should be dynamically switched to multicast service if MBMS resources become available in an eNB. An access network resource is deemed "unavailable" where the network lacks the resource due to lack of capacity, the resource is otherwise engaged and not free to be re-allocated, or a UE lacks authorization to utilize the resource.

Figure 4:
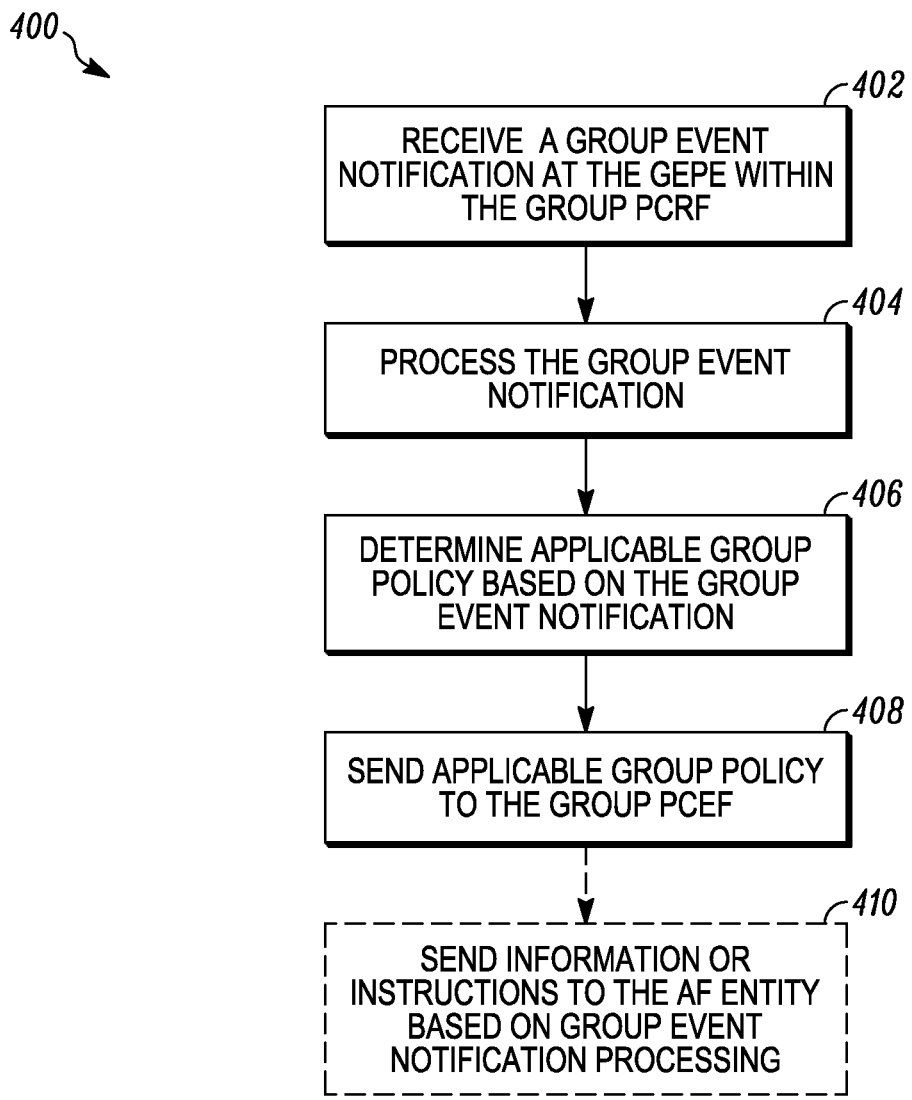
FIG. 4 is a logical flowchart illustrating the handling of group event notifications in accordance with an embodiment of the present teachings.
Figure 5:
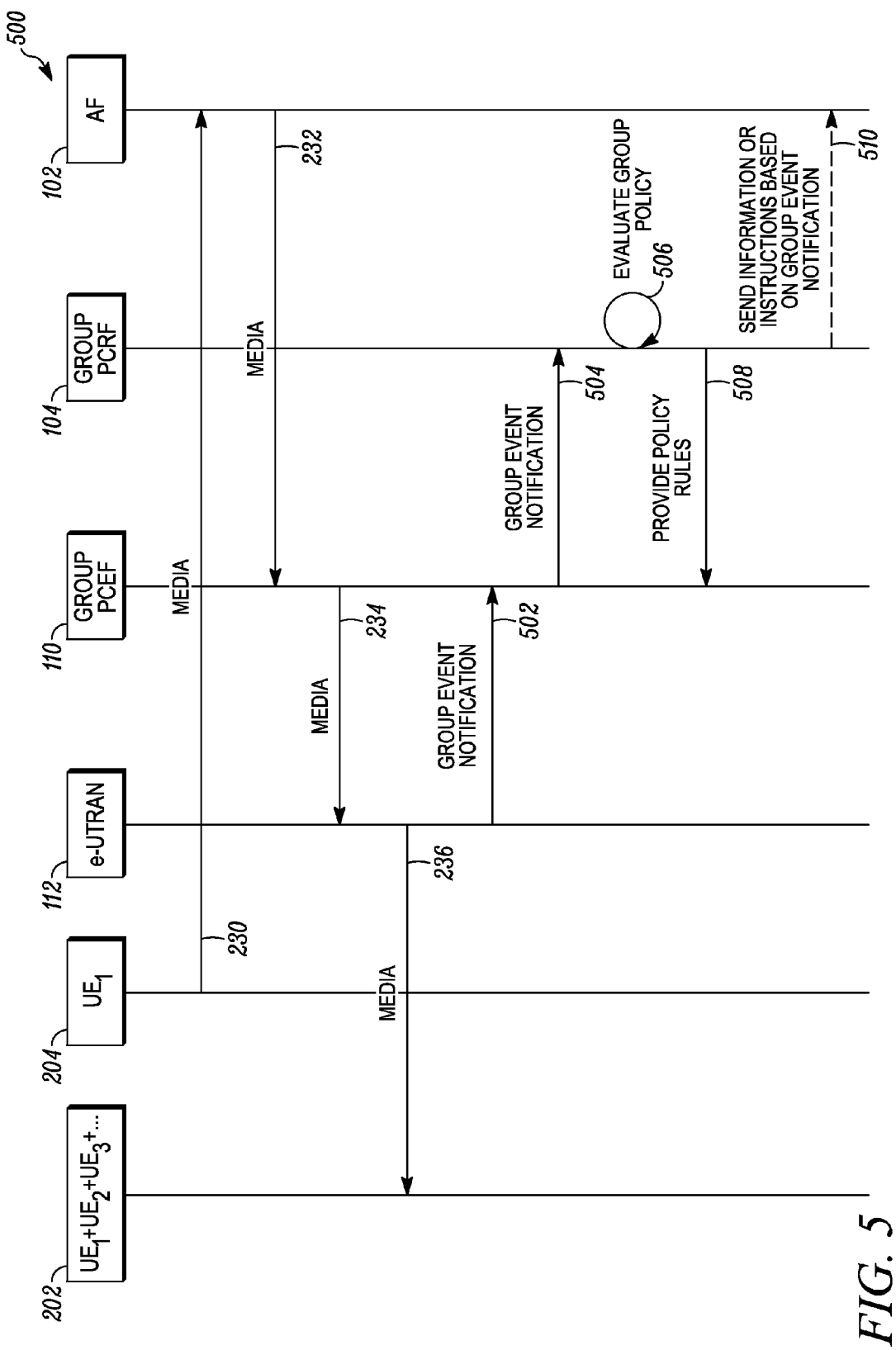
FIG. 5 is a message sequence diagram illustrating the handling of group event notifications in accordance with an embodiment of the present teachings.

Turning now to FIGS. 4 and 5, a logical flowchart and message sequence diagram are respectively shown illustrating the handling of group event notifications in accordance with an embodiment of the present teachings. The process described by reference to FIGS. 4 and 5 can occur during session initiation or modification (e.g., a UE joining or leaving a group session, or a modification to an existing bearer). In particular, FIGS. 4 and 5 illustrate the processing of group event notifications within an MBMS-enabled communication system where the functionality of the GEPE 126 resides within the Group PCRF 104 of the core network. A group event is any type of asynchronous (non-cyclic) occurrence that results in a change in state for an entity or resource associated with a group session, wherein the group session is established to transmit media using a group access network resource. A group event notification (using any suitable standard or proprietary messaging) is used to signal the occurrence of the group event.

In FIG. 5, an asynchronous group event occurs within the e-UTRAN 112 of the communication system 100 during a group session while media is being exchanged (230-236 from FIG. 2) between participating UEs. This results in a group event notification being generated at the e-UTRAN and being signaled (502) up to the Group PCEF 110. From which system element the group event notification is received depends on the particular group event that occurred. The group event notification is then forwarded (504) to the Group PCRF 104, where it is received (402) and processed (404) by the GEPE 126 that resides within the Group PCRF 104 as shown in FIG. 4.

A set of applicable policy rules is determined by the GEPE 126 within the Group PCRF 104 at 406 (FIG. 4) and 506 (FIG. 5) based on the received group event notification, wherein the determined policy rules control the performance of an action related to a member user equipment of the group session, an access network resource for the group session, or both. At least some of the policy rules in this determined set of policy rules may be sent (408, 508) to the Group PCEF 110, either immediately, or at a later time, to control actions by the Group PCEF 110 as a result of the particular group event occurrence. Such actions may include initiating, modifying, or terminating access network resources, or switching between unicast and group transports as a result of the group event.

If the group event notification is one to which the AF 102 has subscribed, or if it contains information that the AF 102 needs to be made aware of, an optional event message containing relevant information and any necessary instructions may be signaled from the Group PCRF 104 to the AF 102 via the Rx-MB control interface. This is illustrated by FIGS. 4 and 5 at 410 and 510 respectively. In general, any information forwarded to the AF 102 differs from that received at the Group PCRF. For example, whereas the group event notification received by the Group PCRF 104 includes network-related information regarding a group event, such as a change in status of one or more bearers (e.g., change in bearer attributes like QoS or the release of bearers for reallocation), the resultant event message noticed to the AF 102 would comprise more application-orientated information, and might also include actions to be taken by the AF 102 as a consequence of the processing of the group event notification at the Group PCRF 104. An "event message," as defined herein, is the forwarding of information or the transmission of instructions by the GEPE 126, other than the applicable set of policy rules where the GEPE 126 is co-located with the Group PCRF 104, to any other elements within the communication system which is related to the group event notification received by the GEPE 126.

As previously indicated, the GEPE 126 within the Group PCRF 104 may receive a group event notification from one of many system elements within system 100. Where the group event originates in the e-UTRAN 112, as in the example above, the resulting group event notification, which may contain an aggregation of group bearer information, would be transmitted through a plurality of interfaces and network elements. Namely, the notification would be carried from the e-UTRAN 112 to the MME 118 via the M3 control interface, from the MME 118 to the Group PCEF 110 via the Sm control interface, and from the Group PCEF 110 to the Group PCRF 104 via the Gx-MB control interface. Where the group event originates in either the MME 118 or the Group PCEF 110, the resulting notification would be transmitted via the remaining portion of the path described above. Once the group event notification is received at the Group PCRF 104, it is processed as detailed above in 402-410 (FIG. 4) and 506-510 (FIG. 5). In embodiments where the Group PCRF 104 is integrated with the Unicast PCRF 124 to form an Integrated PCRF 902, such as those illustrated by FIGS. 9 and 10, event messages may be signaled (410, 510) from the Integrated PCRF 902 to the AF 102 across an enhanced Rx interface (not shown) that incorporates the functionality of the Rx-MB interface.

Specific examples of group-related events that can be noticed to and processed by the GEPE 126 within the Group PCRF 104 include, but are not limited to: a change in a QoS parameter for a group access network resource; a member user equipment has joined or left a group session; a start event (meaning a group access network resource was established), a modification event (meaning a group access network resource was modified), or end event (meaning a group access network resource was terminated) for a group access network resource; an unavailability of a requested group access network resource; a member user equipment of the group session has switched from a group transport to a unicast transport; establishment of a requested group access network resource was successful or unsuccessful; a security event, such as the successful change of a group key, or a notification event that a change of the group key is necessary; or a change in at least one group session attribute (e.g., length of the group session, average number of group members during the group session, etc.).

As an illustrative example, a change in a QoS parameter for a group access network resource triggers a group event notification that is signaled over the Gx-MB interface to the GEPE 126 within the Group PCRF 104 for processing. QoS parameters that might trigger a group event notification include a change in bandwidth, packet loss, latency, priority, or any other parameter associated with the QoS for the group access network resource. The resulting policy actions which are controlled by the group policy determined by the Group PCRF 104 include, but are not limited to, the AF 102: adjusting how the user plane media is encoded (e.g., adjusting the codec output bandwidth); dropping select user-plane packets; or directing the UEs to utilize alternative network technologies.

Another illustrative group event is a member user equipment joining or leaving a group session as signaled by the Group PCEF 110 in a group event notification sent over the Gx-MB interface to the GEPE 126 within the Group PCRF 104. Resulting group policy actions (controlled by the group policy determined by the Group PCRF 104 and sent to the Group PCEF 110 back over the Gx-MB interface) might include: adjustments to the group transport based on the revised group membership (e.g., adjustment to the QoS for the group resource, or adding or releasing a group transport); changing the bearer bandwidth or other attributes; or switching to a different type of bearer (e.g., unicast, multicast, or broadcast).

Another example group event is a group access network resource being successfully established, modified, or terminated as signaled in a group event notification from the Group PCEF 110 (originating from the MME or the eUTRAN) to the Group PCRF 104 GEPE over the Gx-MB interface. In response thereto, the determined group policy controls the Group PCRF 104 to send a corresponding event message to the AF 102 over the Rx-MB interface.

A further illustrative group event might be that the establishment or modification of a group access network resource was unsuccessful, or that a group bearer was lost. In some instances, a system failure or insufficient authorization may result in an inability to set up or modify a requested group transport. This scenario results in a group event notification being communicated to the Group PCRF 104 and then an event message being communicated to the AF 102. Resulting actions by the Group PCEF 110 based upon group policy received from the Group PCRF 104 might include: adjusting the group transport based on the group bearer outcome; moving UEs to a unicast transport; ordering UEs to utilize an alternative access network; or queuing a bearer request for a later attempt.

Another illustrative group event is the unavailability of a requested group access network resource. MBMS resources, for example, may be unavailable at some or all the eNBs in a given service area. An example resulting action, based on determined group policy, is the modification of the group transport by the Group PCEF 110 in accordance with available eNB resources. Another example event is a group bearer error, such as an invalid group bearer request. The resulting action, based upon determined group policy, might call for the modification by the Group PCEF 110 of the group bearer attributes for a group session.

Figure 6:
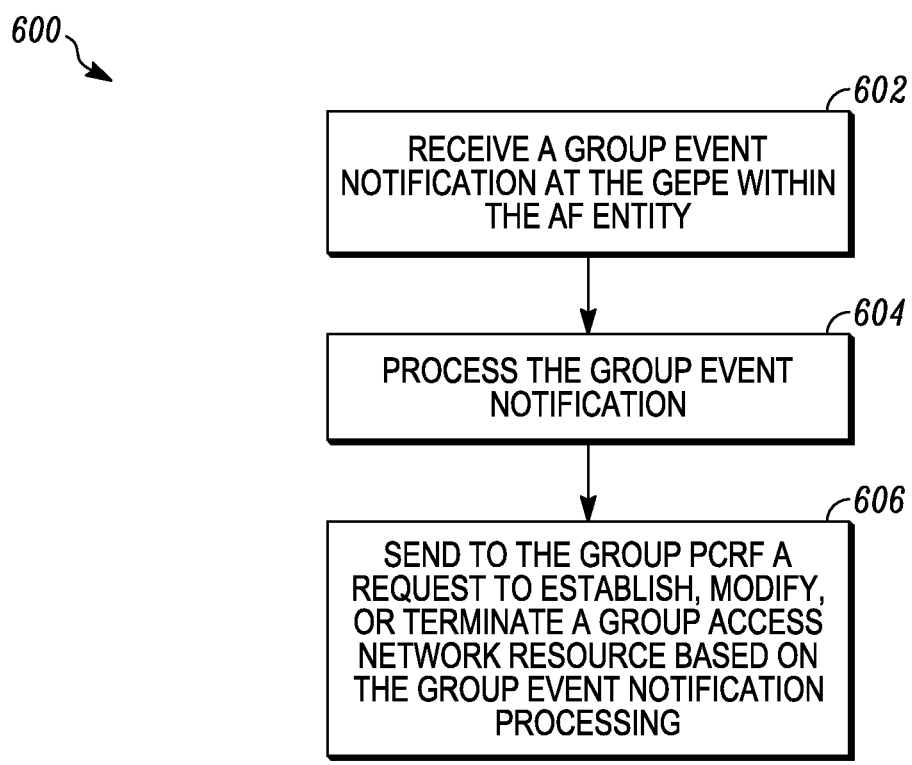
FIG. 6 is a logical flowchart illustrating the handling of group event notifications in accordance with an embodiment of the present teachings.
Figure 7:
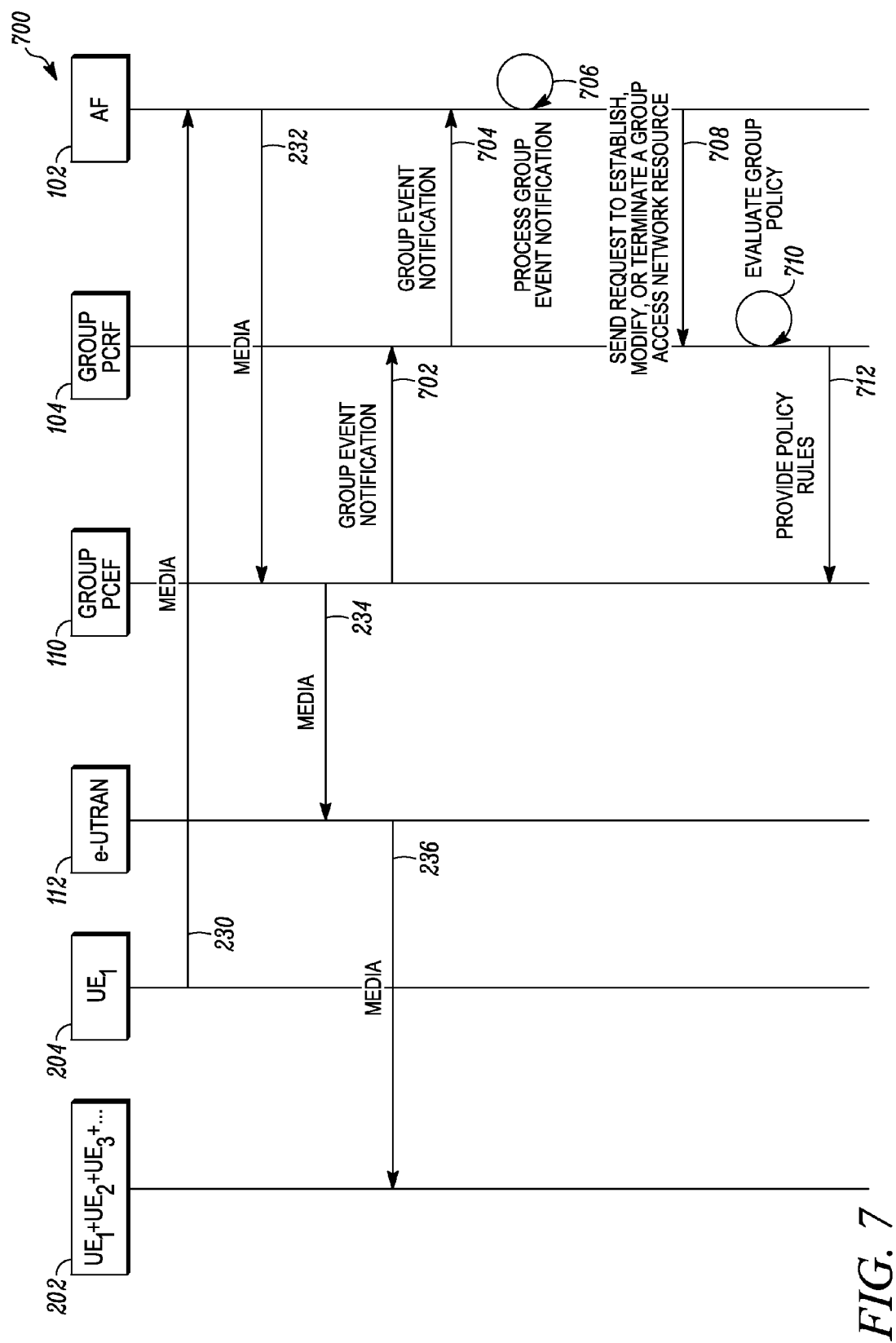
FIG. 7 is a message sequence diagram illustrating the handling of group event notifications in accordance with an embodiment of the present teachings.

FIGS. 6 and 7 also respectively comprise a logical flowchart and a message sequence diagram illustrating the handling of group event notifications in accordance with an embodiment of the present teachings. FIGS. 6 and 7, however, distinguish themselves from FIGS. 4 and 5 in that they describe the processing of group event notifications within an MBMS-enabled communication system where the functionality of the GEPE 126 resides within the AF 102 as opposed to the Group PCRF 104. In particular, FIG. 7 shows the occurrence of a group event while media (230-236 from FIG. 2) is being exchanged during a group session. The group event, originating at the Group PCEF 110, spawns a group event notification that is signaled (702) from the Group PCEF 110 to the Group PCRF 104 across the Gx-MB interface. In this embodiment, where the GEPE 126 no longer resides with the Group PCRF 104, the group event notification is forwarded 704 to the AF 102 for processing.

Figure 9:
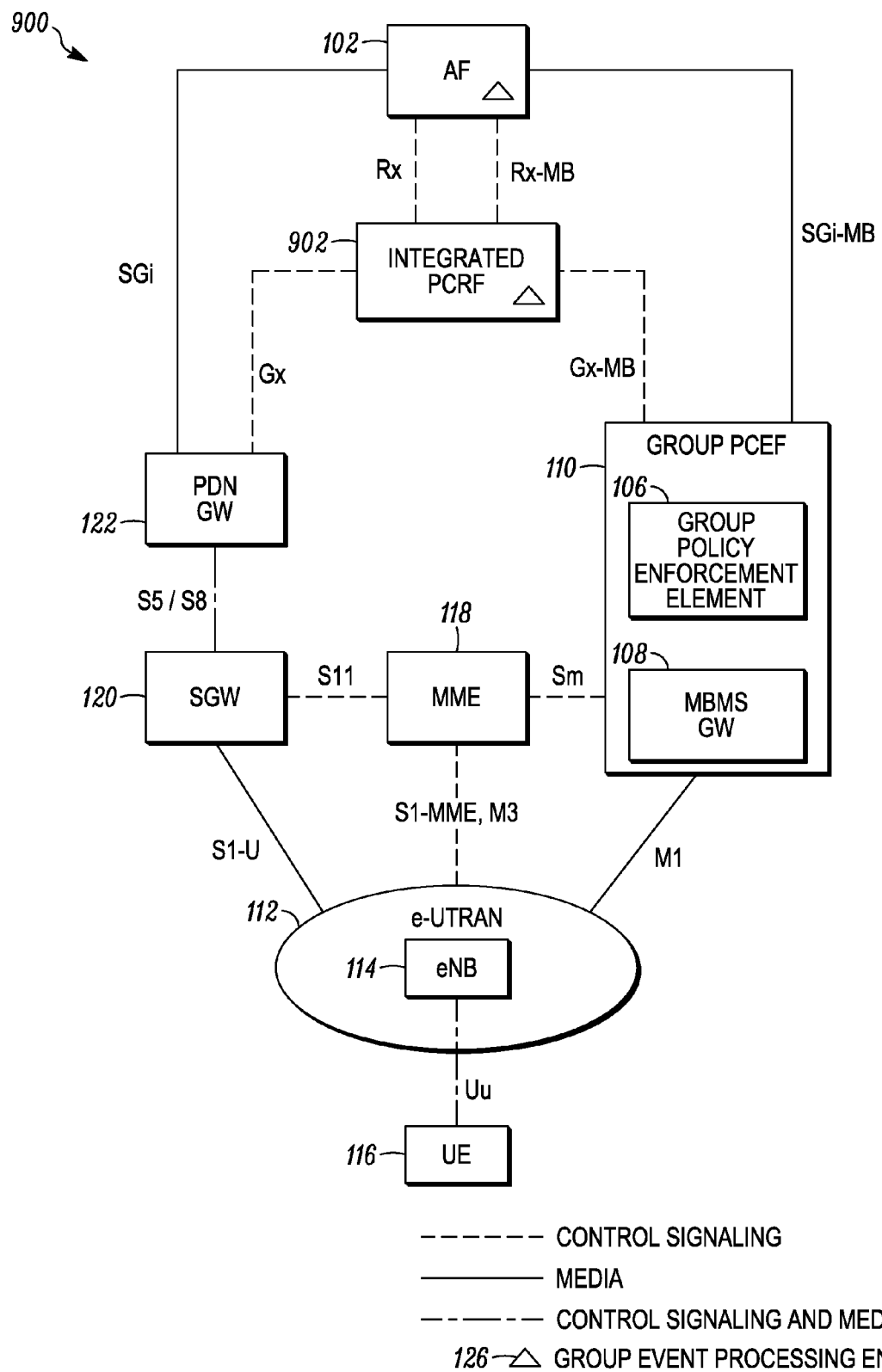
FIG. 9 is a block diagram illustrating a communication system adapted for implementing embodiments of the present teachings.
Figure 10:
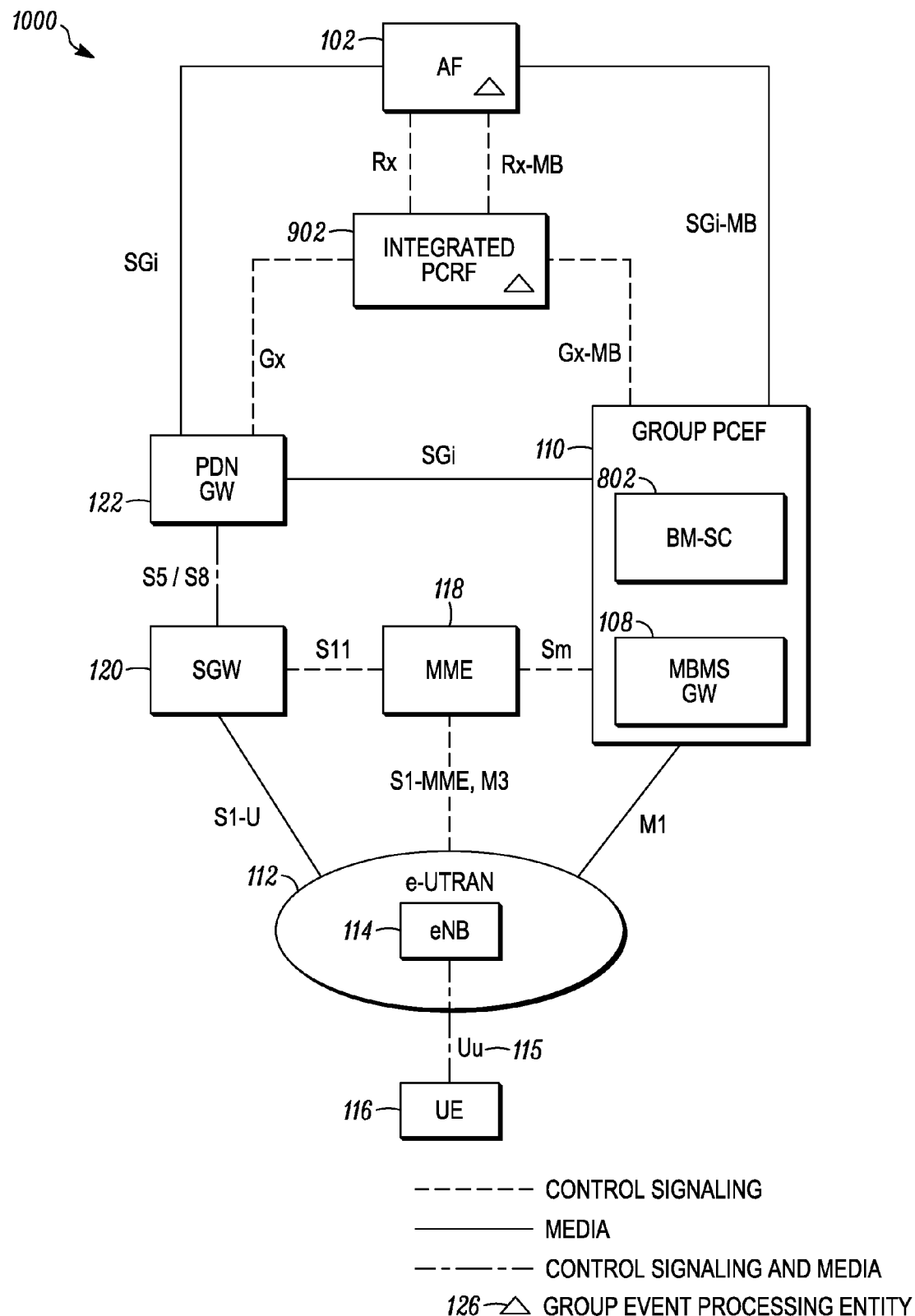
FIG. 10 is a block diagram illustrating a communication system adapted for implementing embodiments of the present teachings.

After the group event notification is received (602) at the AF 102, it is processed (604, 706) by the GEPE 126. Thereafter, a request to establish, modify, or terminate a group access network resource based on the processing of the group event notification by the GEPE 126 is sent (606, 708) from the AF 102 to the Group PCRF 104 back across the Rx-MB interface, or possibly an enhanced Rx interface (not shown) if the Group PCRF 104 is co-located with the Unicast PCRF 124 as shown in FIGS. 9 and 10. In response to the request, the Group PCRF 104 (or possibly the Integrated PCRF 902) will provision a set of applicable policy rules 710 and push (712) at least one rule across the Gx-MB interface to the Group PCEF 110 for enforcement.

An example of a group event notification that might be processed by the GEPE 126 within the AF 102 would be a notification that several participating members of an active group have moved beyond the RAN coverage area. After processing the notification, the GEPE 126 might determine that what remains of the group is to be transferred from multicast to unicast support. This decision is signaled first to the Group PCFR 104 for policy, then to the Group PCEF 110 for enforcement.

We now turn to a brief description of the system elements within communication systems 800, 900, and 1000. In general, as mentioned above the AF 102, Group PCRF 104, and Group PCEF 110 are adapted with functionality and interfaces in accordance with embodiments of the present disclosure. More particularly, the functionality of the Group PCRF 104 and Group PCEF 110 may be realized through different system configurations, leading to alternate system embodiments to the one illustrated by FIG. 1. Shown in FIGS. 8, 9, and 10 are three alternate embodiments to the communication system shown in FIG. 1.

Figure 8:
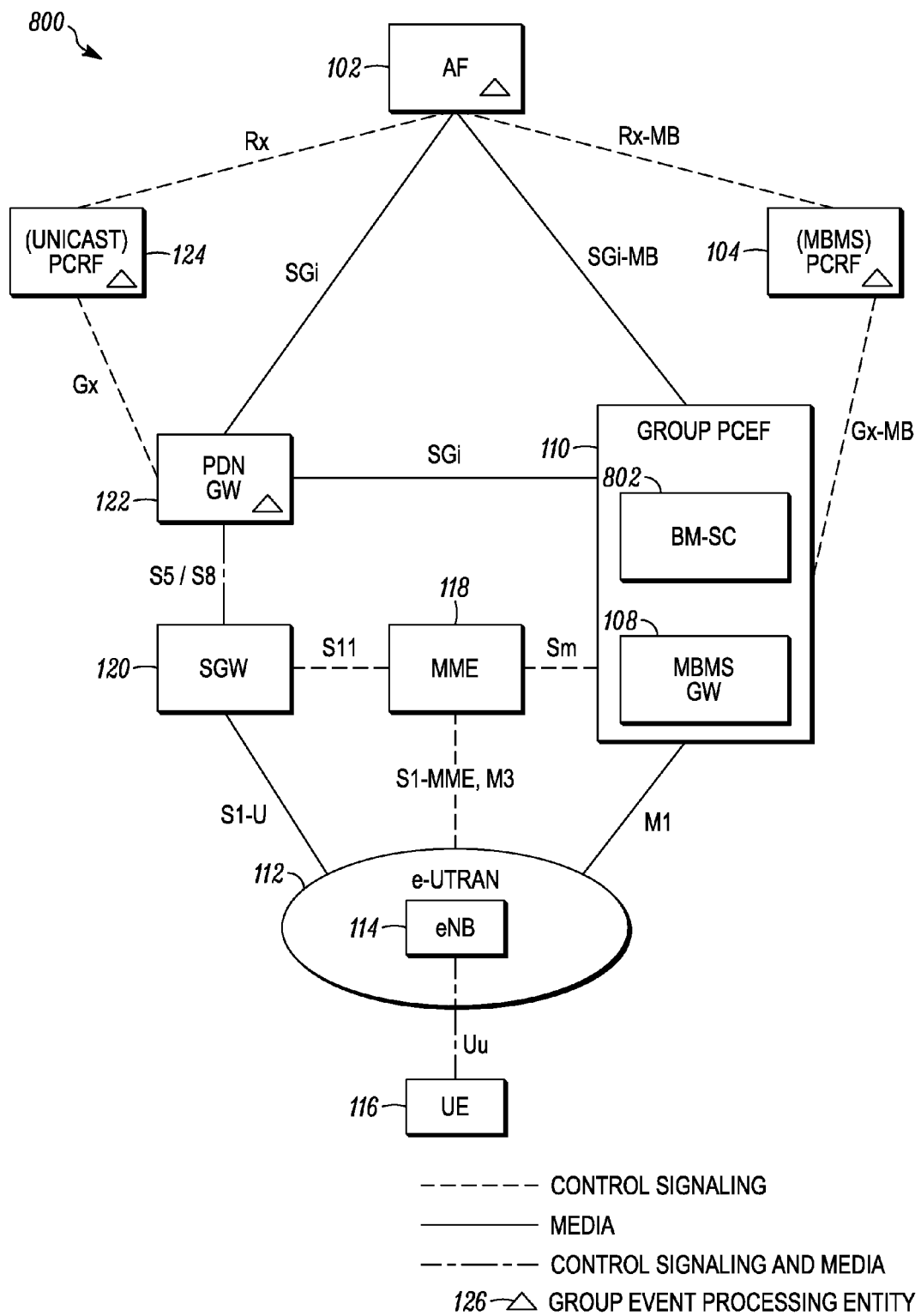
FIG. 8 is a block diagram illustrating a communication system adapted for implementing embodiments of the present teachings.

In FIG. 8, as in FIG. 1, The Group PCRF 104 and the Unicast PCRF 124 are implemented on separate platforms. This requires the use of the Rx-MB interface linking the AF 102 to the Group PCRF 104. By contrast, FIGS. 9 and 10 depict two embodiments where the functionality of the Group PCRF 104 and the Unicast PCRF 124 are been combined into a single Integrated PCRF sharing the same physical platform, shown at 902. In any of the system implementations shown in FIGS. 8-10, a separate 3GPP Rx interface and an Rx-MB interface in accordance with the present teachings can be maintained (as shown). Alternatively, when the unicast PCRF and group PCRF share a physical platform, the 3GPP Rx interface can be enhanced or modified to include the functionality of the Rx-MB interface. One illustrative means of accomplishing a modified Rx interface is to encapsulate group-related policy information into additional AVPs sent over the Rx interface, wherein these additional AVPs carry the group-related policy information using the standard Diameter protocol.

For embodiments where the Group PCRF 104 has been combined with the Unicast PCRF 124 into a single Integrated PCRF 902, as depicted in FIGS. 9 and 10, and where the functionality of and signaling across the Rx-MB interface is incorporated into an enhanced Rx interface (not shown), the signaling by reference to the message sequence diagrams changes. With reference to FIG. 2, for instance, the request 208 to establish a group access network resource is now communicated by the AF 102 to the Integrated PCRF 902 across the enhanced Rx interface. The Integrated PCRF 902 determines 210 the applicable set of group policy rules and pushes 212 it to the Group PCEF 110. The setup acknowledgement 218 communicated from the Integrated PCRF 902 to the AF 102 is also passed over the enhanced Rx interface. All other signaling in FIG. 2 remains the same.

Further, for embodiments where the Group PCRF 104 has been combined with the Unicast PCRF 124, as pictured in FIGS. 9 and 10, the GEPE 126 is located within the Integrated PCRF 902. In such case, group event notifications sent to the Integrated PCRF 902 from the Group PCEF 110 are processed by the GEPE 126 within the Integrated PCRF 902, after which determined policy rules may be sent back across the Gx-MB interface to the Group PCEF 110 for implementation.

To give the Group PCEF 110 the ability to handle group event notifications and to enforce group policy rules, it incorporates functionality that extends beyond the abilities of the standard 3GPP LTE MBMS GW 108 alone. Two means by which this may be accomplished include: enhancing the MBMS GW 108 within the Group PCEF 110 to perform additional tasks, or adding an additional functional element to the Group PCEF 110. In FIGS. 1 and 9, this additional functional element is represented by the GPEE 106.

FIGS. 8 and 10 illustrate embodiments in accordance with the present teachings where the Group PCEF 110 includes a centralized 3GPP Broadcast/Multicast Service Center (BM-SC) 802. Centralized here means that the BM-SC 802 exists physically as a single platform within the network and that its functionality has not been distributed among various other elements that comprise the network. The BM-SC 802 acts as an MBMS data source and is responsible for scheduling MBMS transmissions. Neither the service announcement nor the session and transmission capabilities of the BM-SC 802, however, support mission critical push-to-talk MBMS service. Where the BM-SC 802 is present, an SGi media interface connects the PDN GW 122 to the Group PCEF 110. In contrast to FIGS. 8 and 10, FIGS. 1 and 9 show embodiments where a BM-SC is not included.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . ,a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method, performed by a core network entity implementing a group event processing entity in a point-to-multipoint-enabled communication system, for receiving and processing group event notifications, the method comprising:
   receiving, by the core network entity, a group event notification pertaining to an asynchronous group event occurring during a group session established to transmit media using a group access network resource comprising one of a multicast and broadcast bearer;
   determining, by the core network entity and based on the group event notification, a set of applicable policy rules that control group membership or the group access network resource for the group session;
   transmitting, by the core network entity to a group policy and charging enforcement function, an event message based on the group event notification, wherein the event message is transmitted over an interface established directly between the core network entity and the group policy and charging enforcement function and wherein the event message comprises the determined set of policy rules wherein the group event notification comprises an indication that a member user equipment of the group session has switched from a group transport to a unicast transport.

2. The method of claim 1, wherein the group event notification comprises an indication of a change in a Quality of Service (QoS) parameter for the group access network resource.

3. The method of claim 1, wherein the group event notification comprises an indication that at least one of:
an indication of an unavailability of a requested group access network resource;
a member user equipment has joined the group session; or
a member user equipment has left the group session.

4. The method of claim 1, wherein the group event notification comprises an indication of a group access network resource start event, a group access network resource modification event, or a group access network resource end event.

5. The method of claim 1, wherein the group event notification comprises an indication of at least one of:
establishment of the group access network resource was unsuccessful;
modification of the group access network resource was unsuccessful; or
a change in at least one group session attribute.

6. The method of claim 1, wherein the core network entity is a Policy and Charging Rules Function (PCRF).

7. An apparatus for receiving and processing group event notifications, the apparatus comprising:
a core network entity comprising:
a processing device;
a one or more memory devices coupled to the processing device, the one or more memory devices including instruction code executable by the processor for:
receiving a group event notification pertaining to an asynchronous group event occurring during a group session established to transmit media using a group access network resource comprising one of a multicast and broadcast bearer;
determining, based on the group event notification, a set of applicable policy rules that control group membership or the group access network resource for the group session;
transmitting, to a group policy and charging enforcement function, an event message based on the group event notification, wherein the event message is transmitted over an interface established directly between the core network entity and the group policy and charging enforcement function and wherein the event message comprises the determined set of policy rules;
wherein the one or more memory devices further include instruction code executable by the processor for:
in response to transmitting the event message to the group policy and charging enforcement function, receiving a request to modify group membership or to establish, modify, or terminate a group access network resource in association with the group session.

8. The apparatus of claim 7, wherein the group event notification comprises one or more of:
an indication of unavailability of a requested group access network resource;
an indication that a member user equipment of the group session has switched from a group transport to a unicast transport; or
an indication of at least one of:
establishment of the group access network resource was unsuccessful;
modification of the group access network resource was unsuccessful; or
a change in at least one group session attribute.

9. The apparatus of claim 7, wherein the core network entity is a policy and charging rules function (PCRF).

10. A method, performed by a core network entity implementing a group event processing entity in a point-to-multipoint-enabled communication system, for receiving and processing group event notifications, the method comprising:
receiving, by the core network entity, a group event notification pertaining to an asynchronous group event occurring during a group session established to transmit media using a group access network resource comprising one of a multicast and broadcast bearer;
determining, by the core network entity and based on the group event notification, a set of applicable policy rules that control group membership or the group access network resource for the group session;
transmitting, by the core network entity to a group policy and charging enforcement function, an event message based on the group event notification, wherein the event message is transmitted over an interface established directly between the core network entity and the group policy and charging enforcement function and wherein the event message comprises the determined set of policy rules;
further comprising, in response to transmitting the event message to the group policy and charging enforcement function, receiving, by the core network entity, a request to modify group membership or to establish, modify, or terminate a group access network resource in association with the group session.

* * * * *